US012804095B2

(12) United States Patent
Iwata

(10) Patent No.: US 12,804,095 B2
(45) Date of Patent: Nov. 17, 2026

(54) INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD FOR SERVICE CHARGING BASED ON USER OPERATION

(71) Applicant: FUJIFILM Business Innovation Corp., Tokyo (JP)

(72) Inventor: Masahiro Iwata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/952,335

(22) Filed: Sep. 26, 2022

(65) Prior Publication Data

US 2023/0300274 A1 Sep. 21, 2023

(30) Foreign Application Priority Data

Mar. 17, 2022 (JP) ................................. 2022-042334

(51) Int. Cl.
*H04N 1/34* (2006.01)
*G06T 7/70* (2017.01)
*H04N 1/00* (2006.01)

(52) U.S. Cl.
CPC ............... *H04N 1/344* (2013.01); *G06T 7/70* (2017.01); *H04N 1/00381* (2013.01); *H04N 1/00514* (2013.01)

(58) Field of Classification Search
CPC ......... H04N 1/34–348; H04N 1/00381; H04N 1/00514; G06T 7/70
See application file for complete search history.

(56) References Cited

U.S. PATENT DOCUMENTS

2002/0116233 A1* 8/2002 Kuge ..................... G06Q 10/02 705/5
2013/0321847 A1* 12/2013 Eun .................... H04N 1/00082 358/1.14
2017/0078516 A1* 3/2017 Ishizaki ............. G06Q 30/0283
2017/0149756 A1* 5/2017 Kunieda ............... H04W 12/06
(Continued)

FOREIGN PATENT DOCUMENTS

JP 2020151389 9/2020
JP 2020157003 10/2020
JP 2021126833 9/2021

OTHER PUBLICATIONS

"Notice of reasons for refusal of Japan Counterpart Application", issued on Jan. 20, 2026, with English translation thereof, pp. 1-6.

*Primary Examiner* — Nicholas Pachol
(74) *Attorney, Agent, or Firm* — JCIPRNET

(57) ABSTRACT

An information processing apparatus includes a processor configured to acquire user information that is information for identifying a user who has entered a facility, detect a position of the user in the facility, transmit the user information to an apparatus that is installed in the facility in a case in which it is detected that the user is present at a position where the apparatus is operable, receive operation information, which is information of an operation of the user, from the apparatus, and charge the user according to the operation information.

12 Claims, 9 Drawing Sheets

(56) References Cited

U.S. PATENT DOCUMENTS

| | | | | |
|---|---|---|---|---|
| 2017/0201647 | A1* | 7/2017 | Neville | H04N 1/00344 |
| 2017/0280008 | A1* | 9/2017 | Fujimoto | H04N 1/00344 |
| 2017/0280019 | A1* | 9/2017 | Kajiyama | H04N 1/00347 |
| 2018/0060601 | A1* | 3/2018 | Kay | H04W 12/08 |
| 2019/0205509 | A1* | 7/2019 | Yamashita | G06F 21/34 |
| 2020/0137252 | A1* | 4/2020 | Wada | H04N 1/00326 |
| 2020/0236239 | A1* | 7/2020 | Wada | H04N 1/00891 |
| 2020/0327530 | A1* | 10/2020 | Aoyama | G06Q 20/202 |

* cited by examiner

INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD FOR SERVICE CHARGING BASED ON USER OPERATION

CROSS-REFERENCE TO RELATED APPLICATIONS

This application is based on and claims priority under 35 USC 119 from Japanese Patent Application No. 2022-042334 filed Mar. 17, 2022.

BACKGROUND

(i) Technical Field

The present invention relates to an information processing apparatus, an information processing system, a non-transitory computer readable medium storing an information processing program, and an information processing method.

(ii) Related Art

JP2021-126833A discloses an image forming apparatus including: a reception unit that receives a print job; an acquisition unit that acquires information necessary for calculating a charge for the print job received by the reception unit; a calculation unit that calculates the charge for the print job on the basis of the information necessary for calculating the charge for the print job acquired by the acquisition unit; a detection unit that detects the start of the print job; a display unit; and a display control unit that displays charging information including the charge calculated by the calculation unit on the display unit after the detection unit detects the start of the print job and deletes the displayed charging information at a predetermined timing.

SUMMARY

In recent years, in sales of stores, such as convenience stores, in some cases, a walk-through payment system that does not require registration and payment by a cash register has been introduced. The walk-through payment system is a technique that tracks a user registered in advance and an item put in a shopping cart by the user, using a camera or the like, registers the item as a purchased item, and performs charging and payment to improve user convenience at a store.

However, in a case in which the user uses services using a multifunction machine, a multimedia terminal, and the like installed in the store, a charge is incurred according to the number of printed sheets, the services used, and the like. Therefore, even in a case in which the user is tracked by the camera or the like, it is not possible to check what kind of service is used using the camera or the like. Eventually, it is necessary to pay the charge corresponding to the service used on the spot.

Aspects of non-limiting embodiments of the present disclosure relate to an information processing apparatus, an information processing system, a non-transitory computer readable medium storing an information processing program, and an information processing method that can charge according to the content of services in a case in which the services are used in a walk-through store.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire user information that is information for identifying a user who has entered a facility, detect a position of the user in the facility, transmit the user information to an apparatus that is installed in the facility in a case in which it is detected that the user is present at a position where the apparatus is operable, receive operation information, which is information of an operation of the user, from the apparatus, and charge the user according to the operation information.

BRIEF DESCRIPTION OF THE DRAWINGS

Exemplary embodiment(s) of the present invention will be described in detail based on the following figures, wherein.

DETAILED DESCRIPTION

First Exemplary Embodiment

Figure 1:
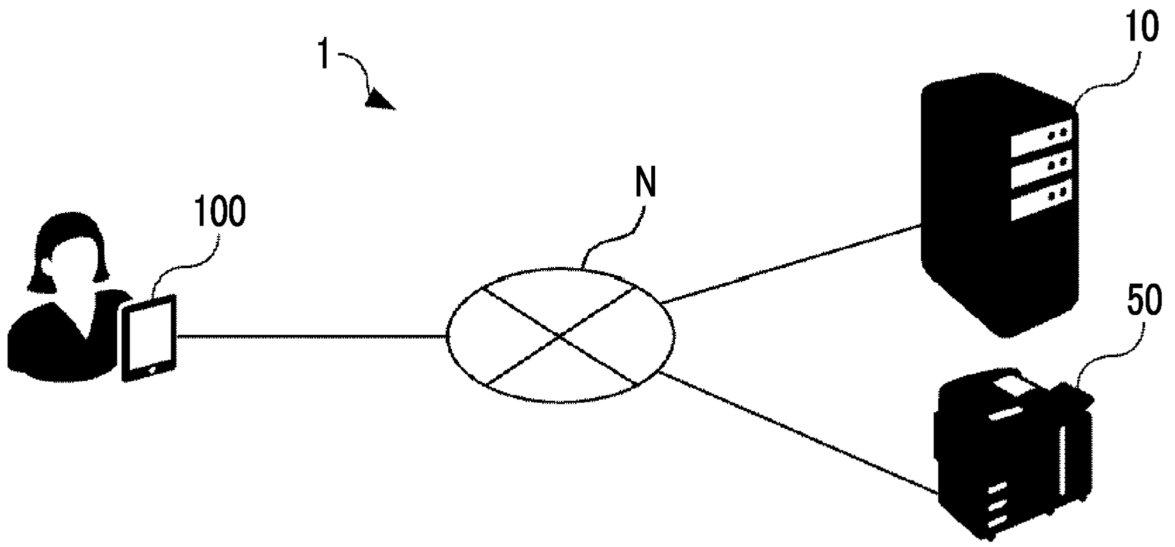
FIG. 1 is a schematic diagram illustrating an example of a configuration of an information processing system according to each exemplary embodiment.

Hereinafter, exemplary embodiments for carrying out the invention will be described in detail with reference to the drawings. FIG. 1 is a schematic diagram illustrating an example of a configuration of an information processing system 1 according to this exemplary embodiment.

For example, as illustrated in FIG. 1, the information processing system 1 is configured to include an information processing apparatus 10 which is a server, a multifunction machine 50 having a printing function and a scanning function, and a user terminal 100 owned by a user. The information processing apparatus 10, the multifunction machine 50, and the user terminal 100 are connected to each other via a network N. In addition, in this exemplary embodiment, an aspect in which an apparatus operated by the user is the multifunction machine 50 will be described. However, this exemplary embodiment is not limited to this aspect. The apparatus operated by the user may be a multimedia terminal.

The information processing apparatus 10 acquires information (hereinafter, referred to as "user information") for identifying the user presented by the user terminal 100 from a reading device 18A, which is installed in a facility, such as a store, and will be described below, and authenticates the user who has entered the facility. The user information is presented, for example, from the user terminal 100 using a Quick Response (QR) code (registered trademark). The information processing apparatus 10 detects the position of the user in the facility using an image or a video (hereinafter, referred to as "an image or the like") acquired from an imaging unit 18B, such as a camera, which is installed in the facility and will be described below. In a case in which the information processing apparatus 10 detects that the user is present at a position where the multifunction machine 50 can be operated, the information processing apparatus 10 transmits the user information to the multifunction machine 50.

The multifunction machine 50 provides services, such as printing and scanning, in response to the operation of the user. The multifunction machine 50 transmits information (hereinafter, referred to as "operation information") indicating the content of the operation performed by the user to the information processing apparatus 10. In addition, in this exemplary embodiment, an aspect in which the multifunction machine 50 transmits operation information related to the operation performed by the user will be described. However, this exemplary embodiment is not limited to this aspect. The operation information may include charge information indicating a charge corresponding to the service provided by the multifunction machine 50 to the user.

The user terminal 100 is a mobile terminal that is owned and carried by the user and presents user information for authenticating the user. The user terminal 100 receives charged information (hereinafter, referred to as "charging information") from the information processing apparatus 10 according to the operation information.

Figure 2:
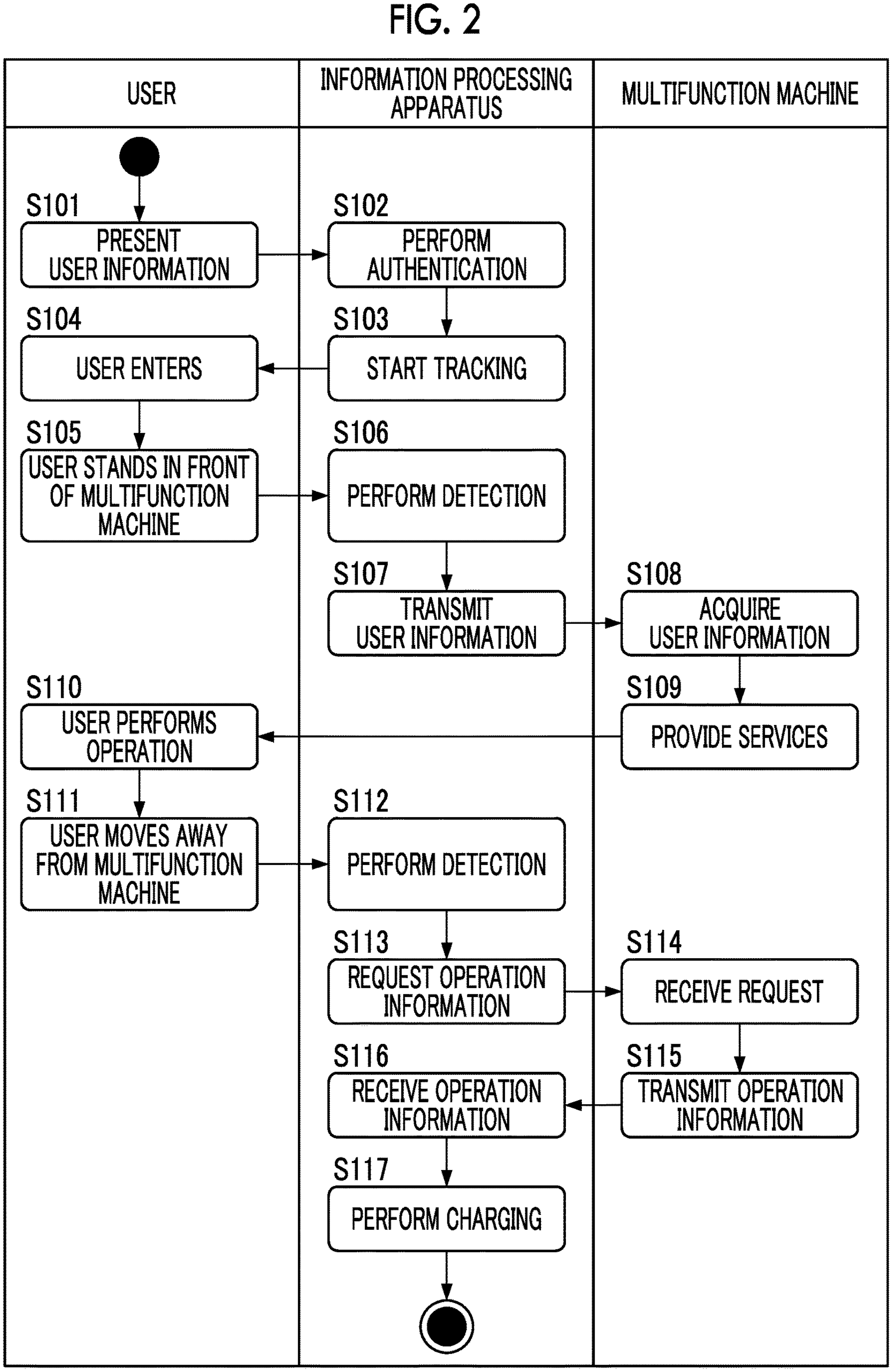
FIG. 2 is an activity diagram illustrating an example of a series of flows from the entrance of a user to charging according to each exemplary embodiment.

Next, a flow from the entrance of the user to the transmission of the charging information by the information processing apparatus 10 will be described with reference to FIG. 2. FIG. 2 is an activity diagram illustrating an example of a series of flows from the entrance of the user to the transmission of the charging information.

For example, as illustrated in FIG. 2, the user presents user information to the reading device 18A, which is installed in the facility and will be described below, using the user terminal 100 (Step S101).

The information processing apparatus 10 acquires the user information and authenticates the user (Step S102). Then, the information processing apparatus 10 specifies and tracks the user in front of the reading device 18A installed in the facility using the image or the like acquired from the imaging unit 18B installed in the facility (Step S103).

The user enters the facility (Step S104) and stands in front of the multifunction machine 50 installed in the facility (Step S105).

In a case in which the information processing apparatus 10 detects that the user is present at a position where the multifunction machine 50 can be operated (Step S106), the information processing apparatus 10 transmits the user information of the user to the multifunction machine 50 (Step S107).

In a case in which the multifunction machine 50 acquires the user information from the information processing apparatus 10 (Step S108), the multifunction machine 50 provides the services of the multifunction machine 50 in response to the operation of the user (Step S109).

The user operates the multifunction machine 50 to receive the provided services (Step S110). In a case in which the operation is ended, the user moves away from the multifunction machine 50 (Step S111).

In a case in which the information processing apparatus 10 detects that the user has moved away from the multifunction machine 50 using the image or the like (Step S112), the information processing apparatus 10 requests operation information indicating the operation performed by the user from the multifunction machine 50 (Step S113).

In a case in which the multifunction machine 50 receives the request from the information processing apparatus 10 (Step S114), the multifunction machine 50 transmits the operation information indicating the operation performed by the user to the information processing apparatus 10 (Step S115).

In a case in which the information processing apparatus 10 receives the operation information (Step S116), the information processing apparatus 10 derives a charge corresponding to the operation information, stores the charge as the charging information in association with the user information, and charges the user.

As described above, the information processing apparatus 10 enables the user to use the multifunction machine without paying a charge corresponding to the use.

Figure 3:
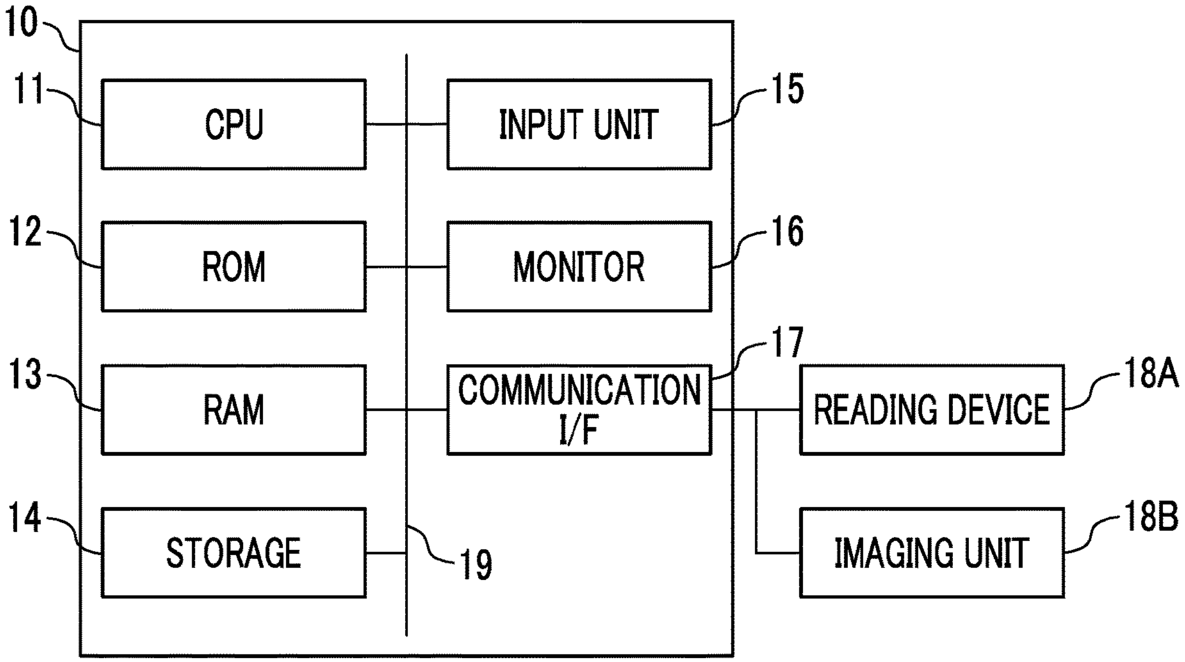
FIG. 3 is a block diagram illustrating an example of a hardware configuration of an information processing apparatus according to each exemplary embodiment.

Next, a hardware configuration of the information processing apparatus 10 will be described with reference to FIG. 3. FIG. 3 is a block diagram illustrating an example of the hardware configuration of the information processing apparatus 10 according to this exemplary embodiment.

As illustrated in FIG. 3, the information processing apparatus 10 according to this exemplary embodiment is configured to include a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and communication I/F 17 are connected to each other by a bus 19. In addition, the information processing apparatus 10 is connected to the reading device 18A and the imaging unit 18B via the communication I/F 17. Here, the CPU 11 is an example of a processor.

The CPU 11 controls the overall operation of the information processing apparatus 10. The ROM 12 stores, for example, various programs including an information processing program used in this exemplary embodiment and data. The RAM 13 is a memory that is used as a work area in a case in which various programs are executed. The CPU 11 expands the program stored in the ROM 12 into the RAM 13 and executes the program to perform user detection and a charging process.

The storage 14 is, for example, a hard disk drive (HDD), a solid state drive (SSD), or a flash memory. The storage 14 according to this exemplary embodiment includes a user information DB (database) for authenticating user information and a charge information DB indicating a charge generated by the operation of the user. In addition, the storage 14 may store, for example, the information processing program.

The input unit 15 is a mouse, a keyboard, or the like that receives the input of text or the like. The monitor 16 displays text and images. The communication I/F 17 transmits and receives data.

The reading device 18A is a device for reading a QR code (registered trademark) installed in the facility. Further, an aspect in which the reading device 18A according to this exemplary embodiment is a QR code reader will be described. However, this exemplary embodiment is not limited to this aspect. The reading device 18A may be a device for reading an integrated circuit (IC) card or may be an input device that receives an authentication number. The imaging unit 18B is an imaging device, such as a camera, that is installed in the facility and images the user in the facility. Furthermore, as the imaging unit 18B, a plurality of imaging devices are installed in the facility in order to image the entire inside of the facility.

Figure 4:
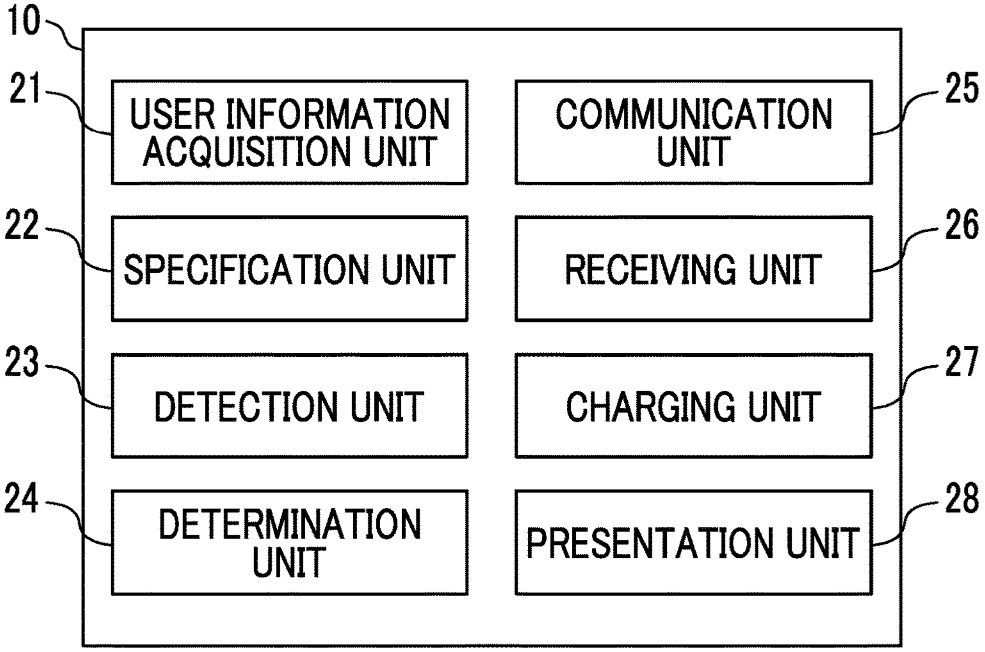
FIG. 4 is a block diagram illustrating an example of a functional configuration of the information processing apparatus according to each exemplary embodiment.

Next, a functional configuration of the information processing apparatus 10 will be described with reference to FIG. 4. FIG. 4 is a block diagram illustrating an example of the functional configuration of the information processing apparatus 10 according to this exemplary embodiment.

For example, as illustrated in FIG. 4, the information processing apparatus 10 includes a user information acquisition unit 21, a specification unit 22, a detection unit 23, a determination unit 24, a transmission unit 25, a receiving unit 26, a charging unit 27, and a presentation unit 28. The CPU 11 executes the information processing program to function as the user information acquisition unit 21, the specification unit 22, the detection unit 23, the determination unit 24, the transmission unit 25, the receiving unit 26, the charging unit 27, and the presentation unit 28.

The user information acquisition unit 21 acquires the user information from the reading device 18A. In addition, the user information according to this exemplary embodiment includes the name of the user and a point of contact of the user.

The specification unit 22 collates the acquired user information with the user information DB that has been registered in advance and specifies and authenticates the user. Further, the specification unit 22 acquires the image or the like from the imaging unit 18B and specifies the user related to the user information using the image or the like. For example, the specification unit 22 specifies a user located in the vicinity of the reading device 18A as the user related to the user information in a case in which the user information acquisition unit 21 acquires the user information. That is, the specification unit 22 specifies the user information that has been registered in advance and the user included in the image or the like in association with each other.

The detection unit 23 identifies each of the specified users and detects the position of each user using the image or the like.

The determination unit 24 determines whether or not the user is present at the position where the multifunction machine 50 can be operated, using the position of the user detected by the detection unit 23. In addition, the position where the multifunction machine 50 according to this exemplary embodiment can be operated is, for example, a range of a predetermined distance from the multifunction machine 50 such as 50 cm from the multifunction machine 50. Further, the determination unit 24 determines whether or not the user has moved away from the position where the multifunction machine 50 can be operated, using the position of the user detected by the detection unit 23.

In a case in which the determination unit 24 determines that the user is present at the position where the multifunction machine 50 can be operated, the transmission unit 25 transmits the user information indicating the user to the multifunction machine 50. In a case in which the determination unit 24 determines that the user has moved away from the position where the multifunction machine 50 can be operated, the transmission unit 25 determines that the operation of the user has ended and transmits a request for operation information to the multifunction machine 50. Further, in a case in which a request for user information is received from the multifunction machine 50, the transmission unit 25 transmits the user information to the multifunction machine 50.

The receiving unit 26 receives the operation information related to the operation of the user from the multifunction machine 50. Furthermore, the receiving unit 26 receives the request for user information from the multifunction machine 50.

The charging unit 27 calculates a charge for the operation according to the operation information and stores the charge as the charging information in association with the user information.

The presentation unit 28 transmits and presents the charging information to the user terminal 100. In addition, in this exemplary embodiment, the aspect in which the charging information is transmitted and presented to the user terminal 100 has been described. However, this exemplary embodiment is not limited to this aspect. For example, a display device (not illustrated) may be installed at the exit of the facility, and the charging information may be transmitted and displayed on the display device to be presented. Alternatively, a printing device (not illustrated) may be installed at the exit of the facility, and the charging information may be transmitted to the printing device and printed as a receipt to be presented.

Figure 5:
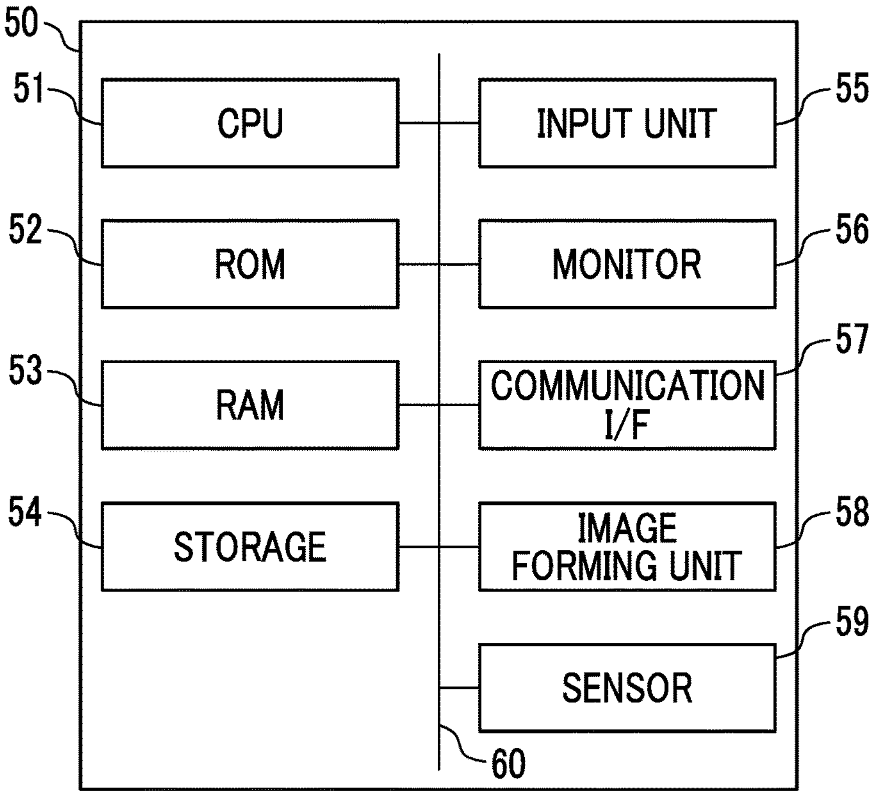
FIG. 5 is a block diagram illustrating an example of a hardware configuration of a multifunction machine according to each exemplary embodiment.

Next, a hardware configuration of the multifunction machine 50 will be described with reference to FIG. 5. FIG. 5 is a block diagram illustrating an example of the hardware configuration of the multifunction machine 50 according to this exemplary embodiment.

The multifunction machine 50 according to this exemplary embodiment is configured to include a CPU 51, a ROM 52, a RAM 53, a storage 54, an input unit 55, a monitor 56, a communication I/F 57, an image forming unit 58, and a sensor 59. The CPU 51, the ROM 52, the RAM 53, the storage 54, the input unit 55, the monitor 56, the communication I/F 57, the image forming unit 58, and the sensor 59 are each connected to each other by a bus 60.

In addition, since the ROM 52, the RAM 53, the storage 54, the input unit 55, the monitor 56, and the communication I/F 57 related to the multifunction machine 50 illustrated in FIG. 5 are identical to the ROM 12, the RAM 13, the storage 14, the input unit 15, the monitor 16, and the communication I/F 17, respectively, the description thereof will not be repeated.

The CPU 51 controls the overall operation of the multifunction machine 50. The CPU 51 expands a program stored in the ROM 52 into the RAM 53 and executes the program to perform an operation reception process of receiving the operation of the user.

The image forming unit 58 is a device having functions including a printing function of outputting an image to a recording medium using print data and a scanner function of reading the image recorded on the recording medium and outputting the image as image data. The sensor 59 is a motion sensor that detects the user located at a predetermined distance from the multifunction machine 50.

Figure 6:
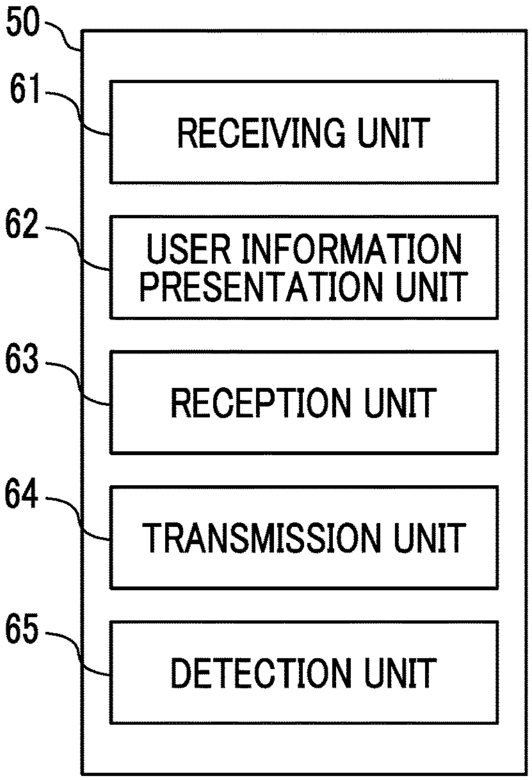
FIG. 6 is a block diagram illustrating an example of a functional configuration of the multifunction machine according to each exemplary embodiment.

Next, a functional configuration of the multifunction machine 50 will be described with reference to FIG. 6. FIG. 6 is a block diagram illustrating an example of the functional configuration of the multifunction machine 50 according to this exemplary embodiment.

For example, as illustrated in FIG. 6, the multifunction machine 50 includes a receiving unit 61, a user information presentation unit 62, a reception unit 63, a transmission unit 64, and a detection unit 65. The CPU 51 executes a reception processing program to function as the receiving unit 61, the user information presentation unit 62, the reception unit 63, the transmission unit 64, and the detection unit 65.

The receiving unit 61 receives user information indicating the user who can operate the multifunction machine 50 and user information of a candidate for the user from the information processing apparatus 10. Further, the receiving unit 61 receives a request for operation information from the information processing apparatus 10.

Figure 7:
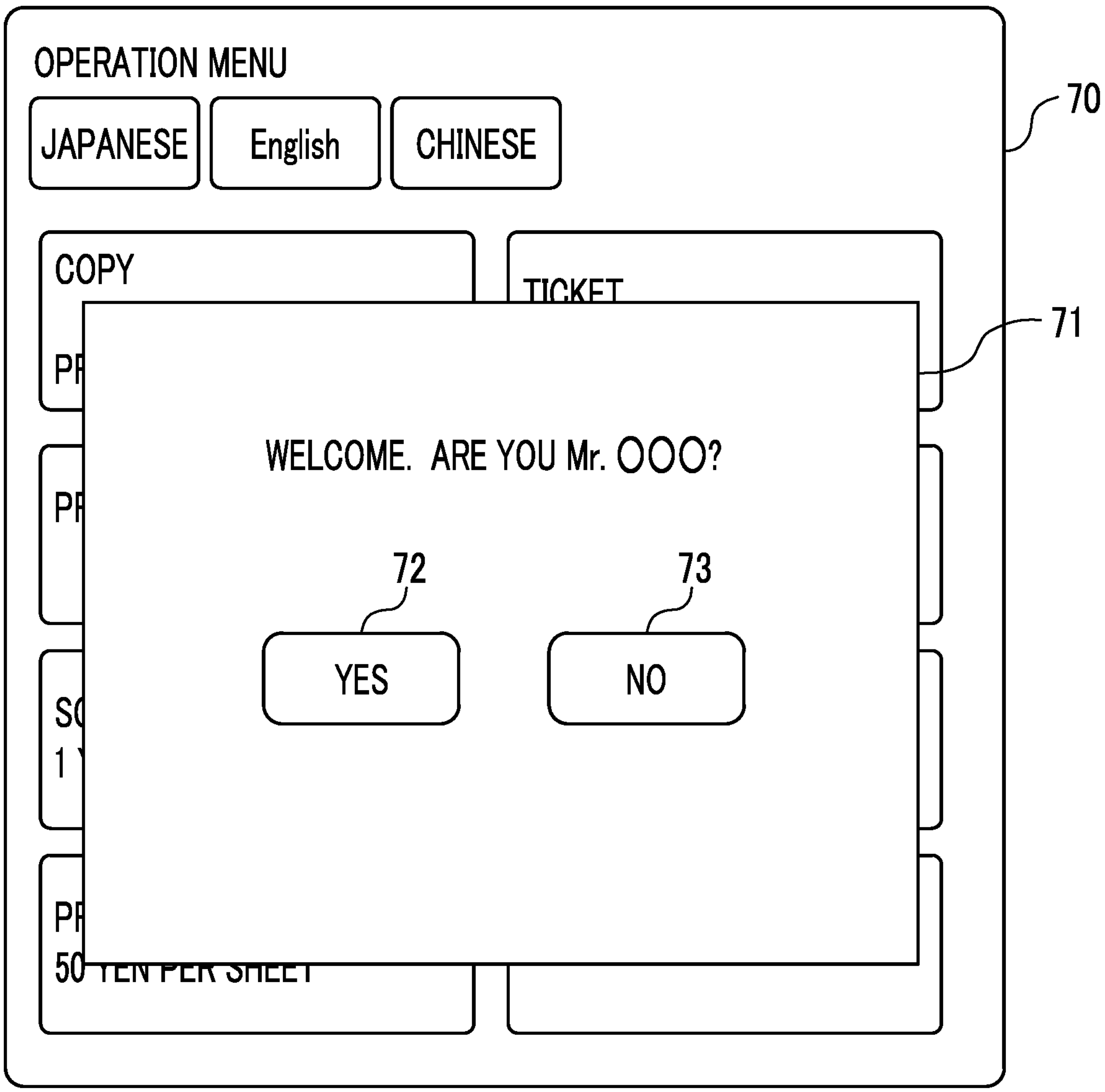
FIG. 7 is a schematic diagram illustrating an example of a reception screen according to each exemplary embodiment.

The user information presentation unit 62 displays the received user information on the monitor 56 to present the user information to the user. For example, as illustrated in FIG. 7, the user information presentation unit 62 presents a reception screen 70 to present the user information to the user. The reception screen 70 illustrated in FIG. 7 includes a user information presentation region 71 and displays a "Yes" button 72 and a "No" button 73 asking whether or not the user is correct in the user information presentation region 71. In a case in which the "No" button 73 is pressed by the user, the user information presentation unit 62 presents the received user information of the candidate for the user.

The reception unit 63 receives the operation of the multifunction machine 50 by the user as the operation information. Further, the reception unit 63 receives the selection of the "Yes" button 72 or the "No" button 73 displayed on the reception screen 70 and identifies the user. Furthermore, in a case in which the reception unit 63 receives the selection of the "No" button 73, the reception unit 63 receives the selection of the user information from the candidate for the user and identifies the user.

For example, in a case in which the "Yes" button 72 displayed in the user information presentation region 71 is pressed on the reception screen 70, the reception unit 63 determines that the correspondence between the user and the user information has been confirmed and provides services according to the operation of the user. In addition, in a case in which the "No" button 73 is pressed, the reception unit 63 receives the selection of the user information from the candidate for the user and identifies the user.

Further, in this exemplary embodiment, the aspect in which the user is identified by pressing the "Yes" button 72 displayed on the reception screen 70 or by selecting user information from the candidate for the user has been described. However, this exemplary embodiment is not limited to this aspect. The user terminal 100 may be notified that the user has been identified. For example, in a case in which the "Yes" button 72 displayed on the reception screen 70 is pressed or user information is selected from the candidate for the user, a point of contact included in the displayed user information and the selected user information may be notified that the confirmation associated with the provision of the services has been made. Therefore, the user can recognize that the services are provided by the multifunction machine 50.

Further, in a case in which user information is selected from the candidate for the user on the reception screen 70, the information processing apparatus 10 may authenticate the user. For example, in a case in which user information is selected from the candidate for the user on the reception screen 70, the multifunction machine 50 transmits the selected user information to the information processing apparatus 10. The information processing apparatus 10 specifies the position of the user related to the selected user information, determines whether or not the user is present at the position where the multifunction machine 50 can be operated, and transmits a determination result to the multifunction machine 50. The multifunction machine 50 may provide services to the user using the determination result. Further, in a case in which the information processing apparatus 10 determines that the position of the user related to the selected user information is not the position where the multifunction machine 50 can be operated, the information processing apparatus 10 may notify the point of contact of the user included in the user information that the confirmation associated with the provision of the services has been made.

In a case in which the transmission unit 64 receives a request for operation information from the information processing apparatus 10, the transmission unit 64 transmits the operation information to the information processing apparatus 10. In addition, the transmission unit 64 transmits a request for the user information of the candidate for the user. Further, in a case in which the detection unit 65, which will be described below, detects the user, the transmission unit 64 transmits a request for user information to the information processing apparatus 10.

The detection unit 65 detects the user who is located at the position where the multifunction machine 50 can be operated, using the sensor 59.

Figure 8:
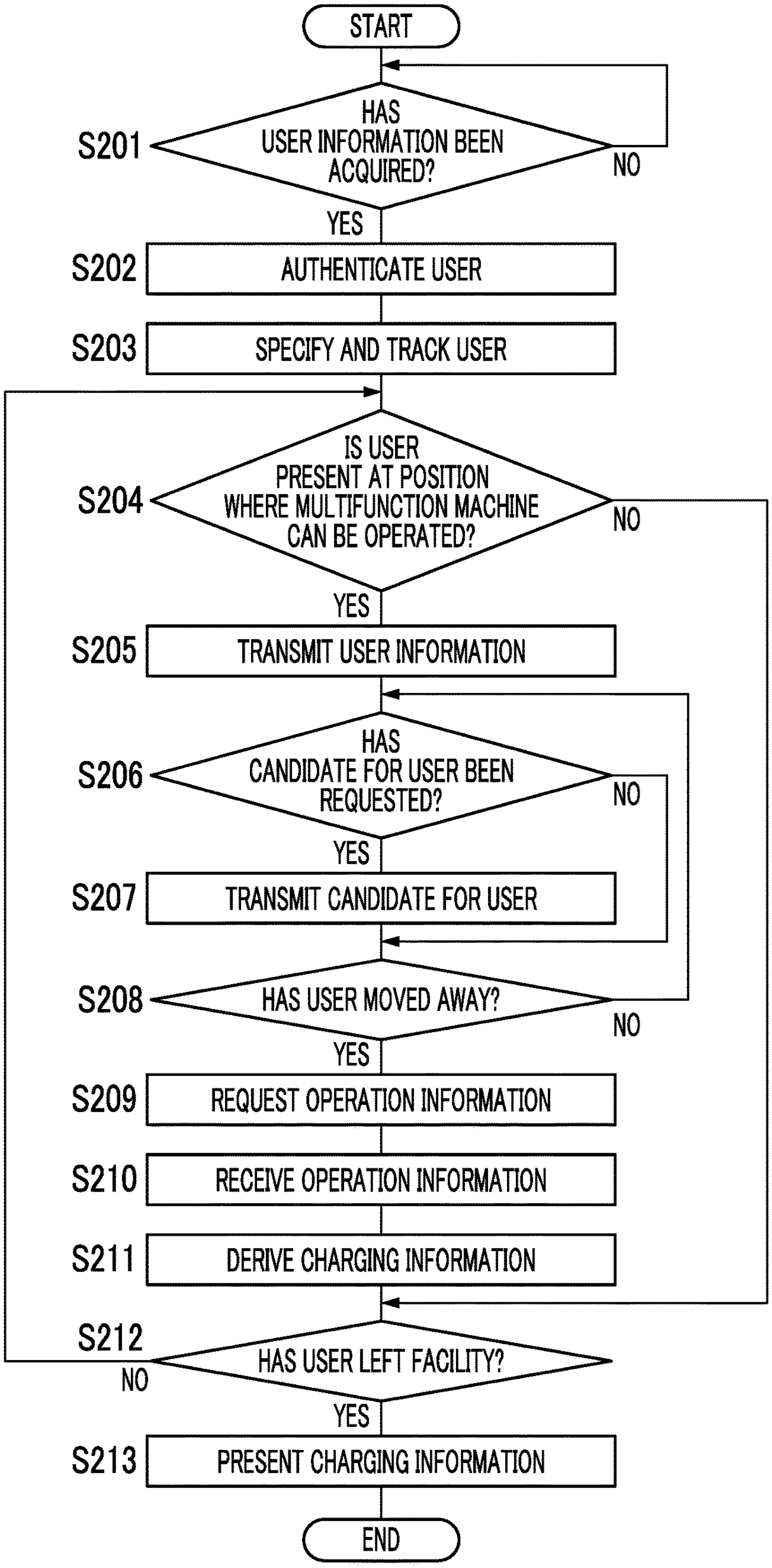
FIG. 8 is a flowchart illustrating an example of a flow of information processing according to the first exemplary embodiment.

Next, the operation of the information processing apparatus 10 according to this exemplary embodiment will be described with reference to FIG. 8. FIG. 8 is a flowchart illustrating an example of user detection and a process of charging the user according to this exemplary embodiment. The CPU 11 reads the information processing program from the ROM 12 or the storage 14 and executes the information processing program to perform information processing illustrated in FIG. 8. The information processing illustrated in FIG. 8 is performed, for example, in a case in which user information is input by the user.

In Step S201, the CPU 11 determines whether or not user information has been input from the user and acquired. In a case in which the user information has been acquired (Step S201: YES), the CPU 11 proceeds to Step S202. On the other hand, in a case in which the user information has not been acquired (Step S201: NO), the CPU 11 waits until the user information is acquired.

In Step S202, the CPU 11 collates the acquired user information with the user information DB to authenticate the user.

In Step S203, the CPU 11 specifies the authenticated user, using the image or the like acquired from the imaging unit 18B, and starts tracking the user.

In Step S204, the CPU 11 determines whether or not the user is present at the position where the multifunction machine 50 can be operated. In a case in which the user is present at the position where the multifunction machine 50 can be operated (Step S204: YES), the CPU 11 proceeds to Step S205. On the other hand, in a case in which the user is not present at the position where the multifunction machine 50 can be operated (Step S204: NO), the CPU 11 proceeds to Step S212.

In Step S205, the CPU 11 transmits the user information to the multifunction machine 50.

In Step S206, the CPU 11 determines whether or not the multifunction machine 50 has requested a candidate for the user. In a case in which a candidate for the user has been requested (Step S206: YES), the CPU 11 proceeds to Step S207. On the other hand, in a case in which a candidate for the user has not been requested (Step S206: NO), the CPU 11 proceeds to Step S208.

In Step S207, the CPU 11 transmits the user information related to the user in the facility as the candidate for the user.

In Step S208, the CPU 11 determines whether or not the user has moved away from the multifunction machine 50. In a case in which the user has moved away from the multifunction machine 50 (Step S208: YES), the CPU 11 proceeds to Step S209. On the other hand, in a case in which the user has not moved away from the multifunction machine 50 (the user is operating the multifunction machine 50) (Step S208: NO), the CPU 11 proceeds to Step S206 and determines whether or not the candidate for the user has been requested.

In Step S209, the CPU 11 transmits a request for operation information to the multifunction machine 50.

In Step S210, the CPU 11 receives operation information from the multifunction machine 50.

In Step S211, the CPU 11 derives a charge corresponding to the operation information as the charging information, using the charge information DB, and stores the charge in association with the user information.

In Step S212, the CPU 11 determines whether or not the user has left the facility. In a case in which the user has left the facility (Step S212: YES), the CPU 11 proceeds to Step S213. On the other hand, in a case in which the user has not left the facility (the user is present in the facility) (Step S212: NO), the CPU 11 proceeds to Step S204 and determines whether or not the user is present at the position where the multifunction machine 50 can be operated.

In Step S213, the CPU 11 presents the charging information associated with the user.

Figure 9:
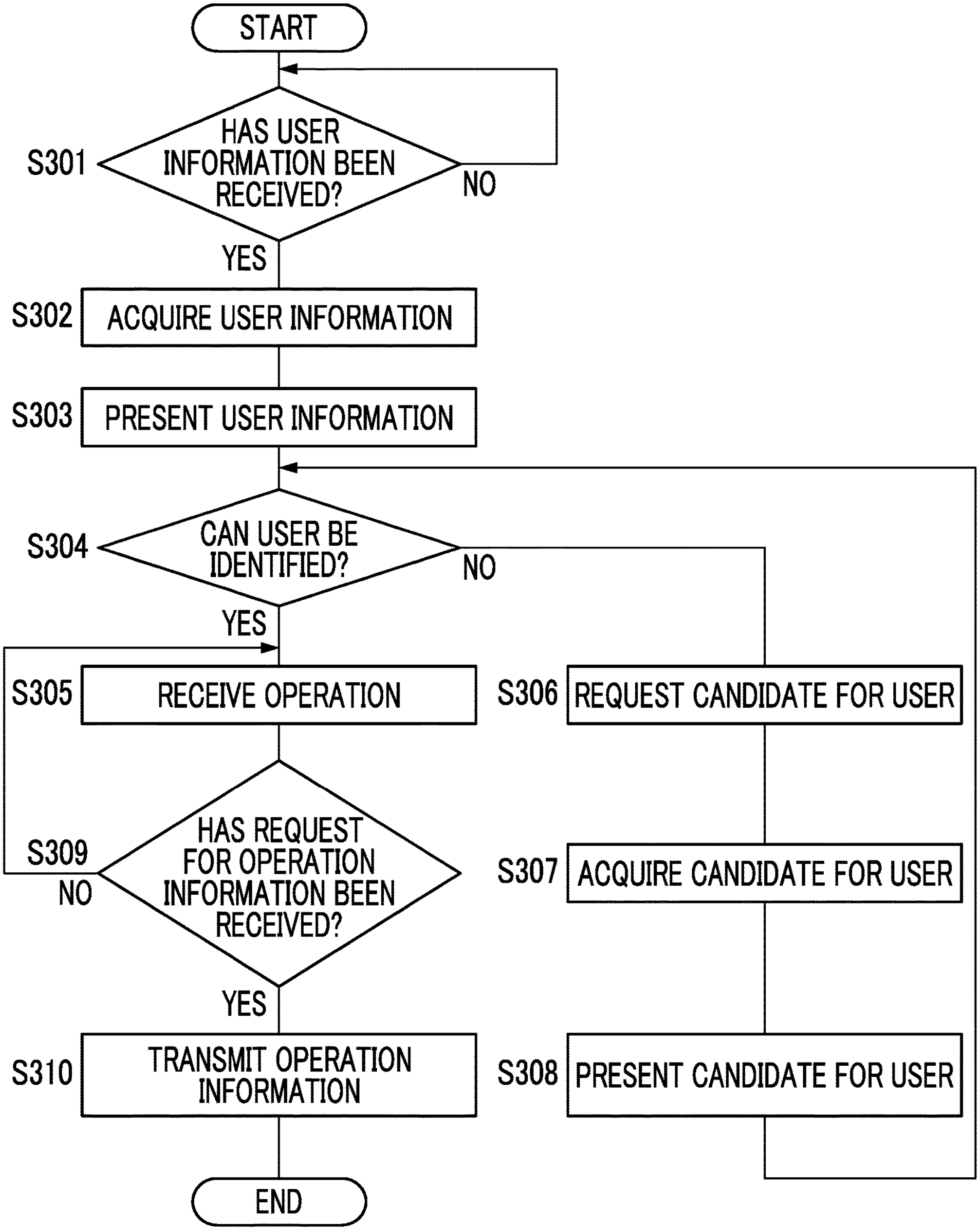
FIG. 9 is a flowchart illustrating an example of a flow of an operation reception process according to the first exemplary embodiment.

Next, the operation of the multifunction machine 50 according to this exemplary embodiment will be described with reference to FIG. 9. FIG. 9 is a flowchart illustrating an example of a process of receiving an operation according to this exemplary embodiment. The CPU 51 reads an operation reception processing program from the ROM 52 or the storage 54 and executes the operation reception processing program to perform an operation reception process illustrated in FIG. 9. The operation reception process illustrated in FIG. 9 is performed, for example, in a case in which user information is received and an instruction to perform the operation reception process is input.

In Step S301, the CPU 51 determines whether or not the user information has been received from the information processing apparatus 10. In a case in which the user information has been received (Step S301: YES), the CPU 51 proceeds to Step S302. On the other hand, in a case in which the user information has not been received (Step S301: NO), the CPU 51 waits until the user information is received from the information processing apparatus 10.

In Step S302, the CPU 51 acquires the received user information.

In Step S303, the CPU 51 displays the reception screen 70 to present the acquired user information.

In Step S304, the CPU 51 determines whether or not the user can be identified. In a case in which the user can be identified (Step S304: YES), the CPU 51 proceeds to Step S305. On the other hand, in a case in which the user is not capable of being identified (Step S304: NO), the CPU 51 proceeds to Step S306. Here, the CPU 51 determines that the user can be identified in a case in which the "Yes" button 72 is pressed on the reception screen 70 and determines that the user is not capable of being identified in a case in which the "No" button 73 is pressed.

In Step S305, the CPU 51 receives the operation of the user and provides services. Here, the CPU 51 stores the operation received from the user.

In Step S306, the CPU 51 transmits a request for the user information of a candidate for the user to the information processing apparatus 10.

In Step S307, the CPU 51 receives and acquires the user information of a candidate for the user from the information processing apparatus 10.

In Step S308, the CPU 51 presents the acquired user information of the candidate for the user and proceeds to Step S304.

In Step S309, the CPU 51 determines whether or not a request for operation information has been received from the information processing apparatus 10. In a case in which the request for operation information has been received (Step S309: YES), the CPU 51 proceeds to Step S310. On the other hand, in a case in which the request for operation information has not been received (Step S309: NO), the CPU 51 proceeds to Step S305 and receives the operation of the user.

In Step S310, the CPU 51 transmits the operation information to the information processing apparatus 10.

Second Exemplary Embodiment

In the first exemplary embodiment, the aspect in which the information processing apparatus 10 detects whether or not the user is present at the position where the multifunction machine 50 can be operated has been described. In this exemplary embodiment, an aspect in which the multifunction machine 50 detects whether or not the user is present at the position where the multifunction machine 50 can be operated will be described.

In addition, in the following description, since the configuration (see FIG. 1) of an information processing system, an activity diagram (see FIG. 2) illustrating a flow from entrance to charging, a hardware configuration (see FIG. 3) of the information processing apparatus 10, a functional configuration (see FIG. 4) of the information processing apparatus 10, a hardware configuration (see FIG. 5) of the multifunction machine 50, a functional configuration (see FIG. 6) of the multifunction machine 50, and a diagram (see FIG. 7) illustrating the reception screen 70 are identical to the corresponding configurations and diagrams in the first exemplary embodiment, the description thereof will not be repeated.

Figure 10:
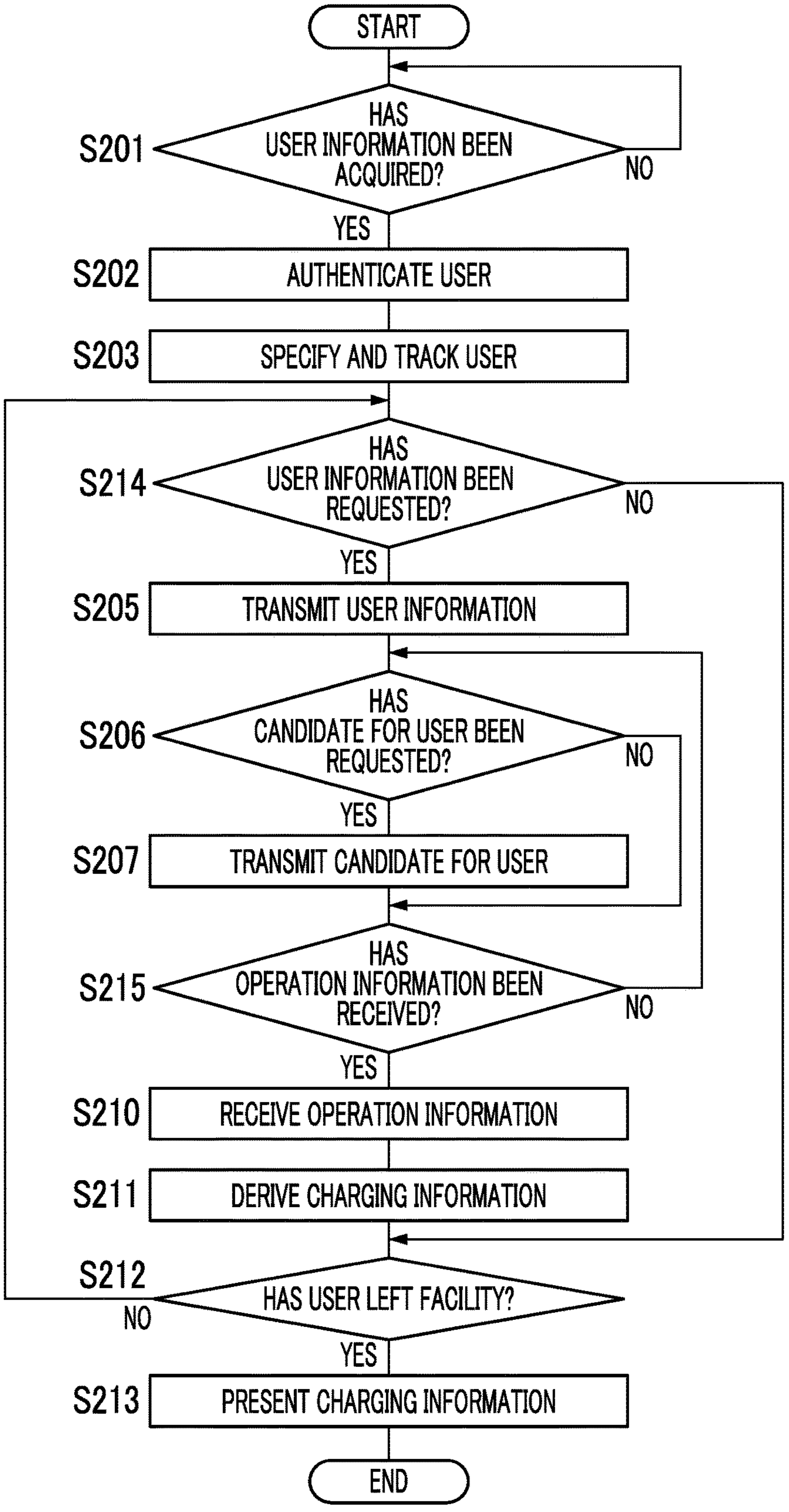
FIG. 10 is a flowchart illustrating an example of a flow of information processing according to a second exemplary embodiment.

First, the operation of the information processing apparatus 10 according to this exemplary embodiment will be described with reference to FIG. 10. FIG. 10 is a flowchart illustrating an example of user detection and a processing of charging the user according to this exemplary embodiment. The CPU 11 reads the information processing program from the ROM 12 or the storage 14 and executes the information processing program to perform information processing illustrated in FIG. 10. The information processing illustrated in FIG. 10 is performed, for example, in a case in which user information is input by the user. In addition, in FIG. 10, steps identical to the steps in the information processing illustrated in FIG. 8 are denoted by reference numerals identical to the reference numerals in FIG. 8, and the description thereof will not be repeated.

In Step S214, the CPU 11 determines whether or not the multifunction machine 50 has requested the user information. In a case in which the user information has been requested (Step S214: YES), the CPU 11 proceeds to Step S205. On the other hand, in a case in which the user information has not been requested (Step S214: NO), the CPU 11 proceeds to Step S212.

In Step S215, the CPU 11 determines whether or not the operation information has been received from the multifunction machine 50. In a case in which the operation information has been received (Step S215: YES), the CPU 11 proceeds to Step S210. On the other hand, in a case in which the operation information has not been received (Step S215: NO), the CPU 11 proceeds to Step S206 and determines whether or not a candidate for the user has been requested.

Figure 11:
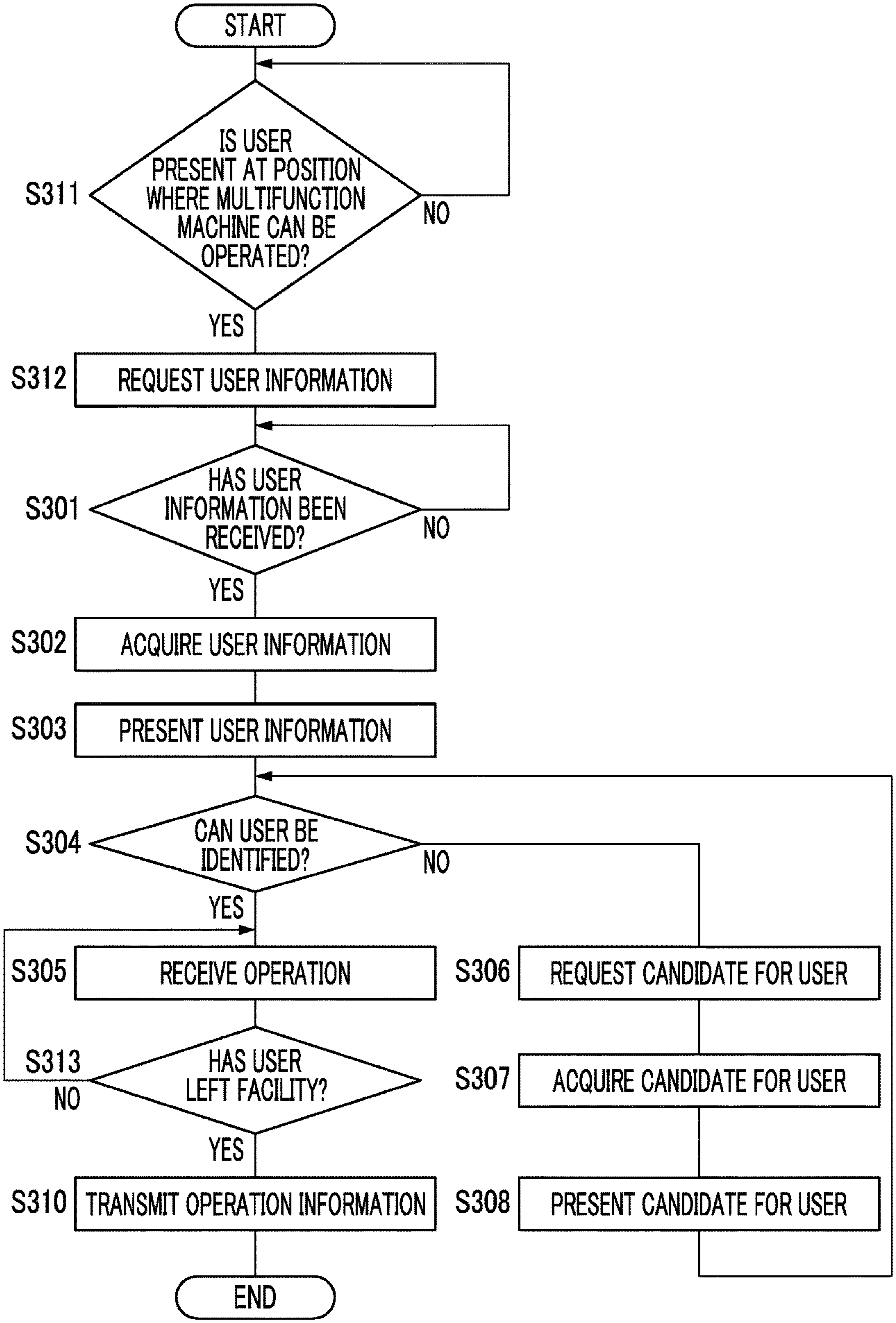
FIG. 11 is a flowchart illustrating an example of a flow of an operation reception process according to the second exemplary embodiment.

Next, an operation reception process will be described with reference to FIG. 11. FIG. 11 is a flowchart illustrating an example of the operation reception process according to this exemplary embodiment. The CPU 51 reads the operation reception processing program from the ROM 52 or the storage 54 and executes the operation reception processing program to perform the operation reception process illustrated in FIG. 11. The operation reception process illustrated in FIG. 11 is performed, for example, in a case in which an instruction to perform the operation reception process is input. In FIG. 11, steps identical to the steps in the operation reception process illustrated in FIG. 9 are denoted by reference numerals identical to the reference numerals in FIG. 9, and the description thereof will not be repeated.

In Step S311 the CPU 51 determines whether or not the user is present at the position where the multifunction machine can be operated. In a case in which the user is present at the position where the multifunction machine can be operated (Step S311: YES), the CPU 51 proceeds to Step S312. On the other hand, in a case in which the user is not present at the position where the multifunction machine can be operated (Step S311: NO), the CPU 51 waits until the user is detected at the position where the multifunction machine can be operated.

In Step S312, the CPU 51 transmits a request for user information to the information processing apparatus 10.

In Step S313, the CPU 51 determines whether or not it is detected that the user has moved away from the position where the multifunction machine can be operated. In a case in which it is detected that the user has moved away from the position where the multifunction machine can be operated (Step S313: YES), the CPU 51 proceeds to Step S310. On the other hand, in a case in which it is not detected that the user has moved away from the position where the multifunction machine can be operated (the user is operating the multifunction machine 50) (Step S313: NO), the CPU 51 proceeds to Step S305 and receives the operation of the user.

As described above, according to this exemplary embodiment, even in a case in which the multifunction machine 50 detects the user, it is possible to charge the user according to the content of services in the walk-through facility.

The invention has been described above using each exemplary embodiment. However, the invention is not limited to the scope described in each exemplary embodiment. Various modifications or improvements of each exemplary embodiment can be made without departing from the gist of the invention, and the modified or improved exemplary embodiments are also included in the technical scope of the invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, in this exemplary embodiment, the aspect in which the information processing program is installed in the storage has been described. However, the invention is not limited to this aspect. The information processing program according to this exemplary embodiment may be recorded on a computer readable storage medium and then provided. For example, the information processing program according to the exemplary embodiment of the invention may be recorded on an optical disk, such as a compact disc (CD)-ROM or a digital versatile disc (DVD)-ROM, and then provided. The information processing program according to the exemplary embodiment of the invention may be recorded on a semiconductor memory, such as a universal serial bus (USB) memory or a memory card, and then provided. Further, the information processing program according to this exemplary embodiment may be acquired from an external device via a communication line connected to the communication I/F.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a processor configured to:

acquire user information that is information for authenticating and identifying a user who has entered a facility;

in response to the user being authenticated, start tracking the user and detect a position of the user in the facility by using an image captured by at least one image capturing device that is installed in the facility and images the user in the facility;

in response to the user detected to be present at a first apparatus that is installed in the facility and being identified by using the image, transmit the user information to the first apparatus;

receive operation information, which is information of an operation of the user performing on the first apparatus, from the first apparatus;

in response to the user detected moving away from a predetermined distance range of the first apparatus, request the operation information from the first apparatus, and calculate a charge corresponding to the operation information as charging information; and in response to the user detected leaving the facility, transmit the charging information to a user terminal associated with the user information.

2. The information processing apparatus according to claim 1, wherein the processor is configured to:

register a point of contact of the user in advance in association with the user information and transmit the charge to the point of contact.

3. The information processing apparatus according to claim 1, wherein the user information includes a point of contact of the user registered in advance, and the processor is configured to:

transmit user information of a candidate for the user to the first apparatus;

receive selected user information from the first apparatus; and transmit information indicating that a user has been identified to the point of contact included in the selected user information in a case in which the user related to the selected user information is not present at the first apparatus.

4. The information processing apparatus according to claim 1, wherein the processor is configured to:

receive a request for a candidate from the first apparatus in response to the first apparatus not being able to identify the user; and transmit the user information related to the user present in the facility to the first apparatus as the candidate.

5. An information processing system comprising:

the information processing apparatus according to claim 1; and the first apparatus that transmits the operation information to the information processing apparatus, wherein the first apparatus transmits the operation information to the information processing apparatus in a case in which the operation of the user ends.

6. The information processing system according to claim 5, wherein the first apparatus includes a sensor that detects the user who is present in a predetermined distance range from the first apparatus, requests the user information from the information processing apparatus in a case in which the user is present in the range, and transmits the operation information to the information processing apparatus in a case in which the user moves away from the range.

7. The information processing system according to claim 5, wherein, in a case in which the user information is received, the first apparatus identifies the user.

8. The information processing system according to claim 7, wherein the user information includes a point of contact of the user registered in advance, and in a case in which the user information corresponds to the user, the first apparatus notifies the point of contact that the user has been identified.

9. The information processing system according to claim 7, wherein, in a case in which the user information does not correspond to the user, the first apparatus presents a candidate for the user information corresponding to the user.

10. The information processing system according to claim 9, wherein the first apparatus presents user information related to a user who is present in the facility as the candidate.

11. A non-transitory computer readable medium storing an information processing program that causes a computer to execute a process comprising:

acquiring user information that is information for authenticating and identifying a user who has entered a facility;

in response to the user being authenticated, starting tracking the user and detecting a position of the user in the facility by using an image captured by at least one image capturing device that is installed in the facility and images the user in the facility;

in response to the user detected to be present at a first apparatus that is installed in the facility and being identified by using the image, transmitting the user information to the first apparatus;

receiving operation information, which is information of an operation of the user performing on the first apparatus, from the first apparatus;

in response to the user detected moving away from a predetermined distance range of the first apparatus, requesting the operation information from the first apparatus, and calculating a charge corresponding to the operation information as charging information; and in response to the user detected leaving the facility, transmitting the charging information to a user terminal associated with the user information.

12. An information processing method comprising:

acquiring user information that is information for authenticating and identifying a user who has entered a facility;

in response to the user being authenticated, starting tracking the user and detecting a position of the user in the facility by using an image captured by at least one image capturing device that is installed in the facility and images the user in the facility;

in response to the user detected to be present at a first apparatus that is installed in the facility and being identified by using the image, transmitting the user information to the first apparatus;

receiving operation information, which is information of an operation of the user performing on the first apparatus, from the first apparatus;

in response to the user detected moving away from a predetermined distance range of the first apparatus, requesting the operation information from the first apparatus, and calculating a charge corresponding to the operation information as charging information; and in response to the user detected leaving the facility, transmitting the charging information to a user terminal associated with the user information.

* * * * *